Patented Aug. 18, 1931

1,819,416

UNITED STATES PATENT OFFICE

MORTIMER T. HARVEY, OF EAST ORANGE, NEW JERSEY, ASSIGNOR TO THE HARVEL CORPORATION, OF NEWARK, NEW JERSEY, A CORPORATION OF NEW JERSEY

COMPOSITIONS OF MATERIALS AND METHOD FOR PRODUCING THEM

No Drawing.    Application filed August 8, 1928. Serial No. 298,412.

The present invention relates to new compositions of matter in which rubber and cashew nut shell liquid are dissolved one in the other or intermixed one with the other, with or without one or more of other materials such as vulcanizers, accelerators, loaders, fillers, and other materials well known and used in the rubber art. The invention further consists in methods and steps for utilizing cashew nut shell liquid in the modification, conditioning, and control of the characteristics and changes in rubber and like materials in their preparation, use and so on. The materials of the invention are useful where rubber and allied products are and for some purposes for which rubber without cashew nut shell liquid cannot be used, and the materials of the invention are useful in the arts generally.

An object of the invention is to provide a composition having rubber as a principal constituent and which is insoluble in petroleums such as gasoline, kerosene, crude oil and so on.

Various other objects and advantgaes of the invention will be obvious from the following description of methods, materials, and compositions embodying the invention; and the invention also consists in certain new and useful methods and steps and compositions and combinations of ingredients hereinafter set forth and claimed.

*Characteristics of materials of invention*

I have discovered that cashew nut shell liquid when intermixed with rubber gives to the latter certain desirable characteristics not hitherto present in rubber, and that without detracting from its general usefulness or having any deleterious effect thereon. A notable effect secured by modifying rubber with cashew nut shell liquid is that insolubility of vulcanized rubber in petroleums, for example, gasoline, kerosene, and crude oil, is secured. The vulcanized rubber so modified is highly valuable for use in flexible hose for gasoline pumps, for packing in gasoline pipe lines and so on. By insolubility in petroleums in this respect I intend and mean that the vulcanized rubber and cashew nut shell liquid compositions and materials of the present invention are not merely insoluble in petroleums but, further, that they are not softened or disintegrated or otherwise deleteriously affected by petroleums.

Another important characteristic that cashew nut shell liquid imparts to rubber, or which is present in a rubber and cashew nut shell liquid composition, is that of resistance to heat. It is well known that rubber ages, breaks down, and disintegrates when subjected to heat for some time, even at temperatures below that at which rubber fuses or depolimerizes. But when cashew nut shell liquid is intermixed with rubber its age and resistance to the deleterious effect of heat is greatly increased. For example, under conditions of raised temperature a given sample of rubber having sulphur therein deteriorated and became brittle within a comparatively short time (a few hours) at a given temperature, whereas a sample of the same rubber (with the original proportion of sulphur therein) which had cashew nut shell liquid intermixed therewith remained alive and fresh for an indeterminate period.

Cashew nut shell liquid when mixed with rubber imparts to the latter a resistance to moisture not inherent in rubber. It is well known that rubber, while generally waterproof, will admit the passage of moisture therethrough. This characteristic of rubber detracts from its value as an electrical insulator particularly for high voltage conductors. Rubber prepared for this purpose and having cashew nut shell liquid incorporated therewith is resistant to the passage of moisture and therefore highly valuable as an electrical insulator.

It has been pointed out that cashew nut shell liquid makes rubber in the vulcanized state insoluble, in the unvulcanized state or partly vulcanized state cashew nut shell liquid has an opposite effect on rubber, that is, it increases the speed of its solution in benzol, petroleums, carbonbisulphide and other common solvents of rubber. For example it is well known that about 1000 c. c. of solvent are necessary for dissolving about 50 grams of raw rubber and that the rubber goes into solution very slowly. The reason such a comparatively large quantity of solvent is required for such a small quantity of rubber is that the latter swells to many times its original volume when it is wetted by the solvent. By the term solution in this respect I intend the common result which is recognized by many to be suspension rather than a solution. When cashew nut shell liquid is intermixed with rubber in a solvent such as those above set forth this characteristic swelling does not occur, and the rubber, in such case, goes into solution very rapidly, and, further, a comparatively small quantity of solvent is required to take the rubber in solution. In such cases the solvent and the cashew nut shell liquid can be mixed together before the rubber is added to the solvent and other methods of preparing the solution or mixtures can be used as will readily appear.

Cashew nut shell liquid can be used by itself to make a solution or suspension of rubber by intermixing the two. The speed of solution or suspension is considerably increased by heating the mixture, for example, to about 80° to 110° centigrade.

The characteristic effect of cashew nut shell liquid on rubber makes it valuable either alone or with one of the solvents above mentioned or other solvents in the reclamation of rubber either in the partly or more fully vulcanized states. A further advantage is that of cashew nut shell liquid can with advantage be left in the rubber in the further use of the rubber. Further the cashew nut shell liquid can be "vulcanized" with the ingredients and under the conditions used to secure the vulcanization of rubber, and the "vulcanized" cashew nut shell liquid has generally the same characteristics as vulcanized rubber. The cashew nut shell liquid and rubber mixture can be worked in the same manner as ordinary rubber for molding and curing under practically the same conditions as have been used for a long time for the molding and vulcanization of rubber alone. The cashew nut shell liquid can be "vulcanized" with sulphur, or an equivalent, sulphur chloride for example, before adding to the rubber, in which case the vulcanizer in the cashew nut shell liquid can be utilized in vulcanizing the rubber, when desired, and additional vulcanizer can be provided for the rubber.

The softening and fluidity of rubber under heat and pressure is also a characteristic of the cashew nut shell liquid and rubber mixture and can be used to the same advantages in the working of the mixture as they are in the handling, treatment, and preparation of rubber itself. In these instances it is to be understood that where rubber itself is referred to it is understood that either pure rubber or the commercial rubber mixtures which contain one or more other ingredients such as vegetable and mineral pitches, waxes, sludges, paraffine, vaseline, tar, vegetable oils, gilsonite, asphalt, fats, glues, and so on, and that these materials can be used in like manner in the cashew nut shell liquid and rubber preparations and compositions of the present invention. Also the inorganic fillers and coloring agents can be used, in other words, cashew nut shell liquid can be used with rubber in the general and well known practice of the art of handling and preparation of rubber as now developed to secure new and valuable characteristics in materials and compositions and articles heretofore similarly made and to adapt rubber for uses for which it was not suitable hitherto.

The rubber and cashew nut shell liquid preparations and compositions of the invention are more highly resistant to sulphuric acid than are ordinary rubber compositions, and this is particularly true of the soft and pliable compositions of the invention as compared with soft and pliable rubber compositions.

*Further methods and compositions of the invention*

The cashew nut shell liquid, as above stated, can be added or intermixed with rubber either with or without the aid of a solvent or vehicle. For example; the rubber can be dissolved in a solvent and then mixed with the cashew nut shell liquid; or both the materials can be mixed together and dissolved in a single body of solvent; or the two materials can be dissolved separately and the two solutions mixed together; or the rubber can be mixed with or dissolved in cashew nut shell liquid with the aid of heat. In this latter case the two can be mixed together and heated in an oven to bring about the solution, or the two can be mixed together on calendering rolls and the heat produced by the friction of the materials on the rolls utilized to bring about the mixture or solution. The cashew nut shell liquid will plasticize sulphur as well as rubber and sulphur so plasticized can be used for vulcanizing rubber because of the ease with which it can be thoroughly and uniformly intermixed with rubber. In cases where sulphur plasticized in this manner is used in the vulcanization of rubber the cashew nut shell liquid can be used for modifying the rubber, but as a small quantity of cashew nut shell liquid can be used to plasticize a comparatively large quantity of sulphur the cashew nut shell liquid can be used in amounts to suit the nature of the treatment and to suit the characteristics desired in the intermediate or finished rubber product. In any of the examples above given in this paragraph sulphur and/or some other vulcanizer can be added during or after the production of the solution or mixture. Fillers, both organic and inorganic, some of which are above mentioned, can be used in these mixtures in the manner in which they are used in the rubber art. And the cashew nut shell liquid and rubber materials and compositions of the invention can be vulcanized in a manner similar to that of the vulcanization of rubber, the common vulcanizing temperatures of 120° to 150° C., for example, being suitable, although vulcanization will begin at lower temperatures and can be carried on at higher temperatures. The vulcanization can be carried on in molds under pressure, or in chambers containing steam or heated air under pressure, or in other manners well known in the rubber art. The time of vulcanization is comparable to the time required for the vulcanization of rubber under similar conditions. Accelerators as well as vulcanizers can be used in the compositions of the invention in the same manner as they are used in the vulcanization of rubber, some of the suitable accelerators, being for example, selenium, litharge, aniline bases, amides, amines, and other well known accelerators. Sulphur chloride, and hydrogen sulphide and sulphur dioxide can be used as vulcanizers.

Rubber in the various well known forms such as nigger head, crepe, smoked, latex, and so on are suitable in the materials and compositions of the invention. The cashew nut shell liquid can be utilized in the transportation of latex to keep it from getting sour by intermixing the two together, either with or without preheating.

Particular proportions of cashew nut shell liquid and rubber for general use are, for example, equal parts by weight, but these proportions can be varied greatly in both directions. The cashew nut shell liquid can be considered as filler for the rubber and used as such in the general practice of rubber handling and preparation with this difference, of course, that the cashew nut shell liquid imparts to the rubber mixture the characteristics and effects above set forth.

Also when it is desired to render a rubber-cashew nut shell liquid composition hard or stiff in the final state I mix with them a material which will harden or set the cashew nut shell liquid upon the application of heat or after the passage of a reaction time period. Such materials are copper oxide, barium oxide, alkaline oxide or hydroxide, zinc oxide, copper metal, manganese resinate, or the like. In such case the effect is similar to that of hexamethylene tetramine, the amount of modifying material used being governed by the degree of stiffness or hardness desired. In some cases the hardening reaction substance is utilized as a filler for molded compound substances and the like.

Hexamethylenetetramine reacts with cashew nut shell liquid and gives it a stiffness and body and this characteristic can be utilized in cashew nut shell liquid and rubber mixtures to stiffen, set, or harden the latter, and can be used in molded products, impregnated fabrics and so on. Materials made with hexamethylenetetramine, or similarly acting products such as formaldehyde, phosphorous oxychloride, etc., can be made to have the characteristic of resiliency and without a melting flow point.

Formaldehyde or glycerine or both can be used to modify the cashew nut shell liquid either before or after it is intermixed with the rubber, in the compositions and materials of the invention, either with or without the use of heat to bring about reactions and modifications as required. And the cashew nut shell liquid can be modified by heating, up to 600° C. for example, before it is added to the rubber.

The products of the invention are suitable for use in waterproof materials, petroleum insoluble materials, rubber tape, electrical insulation, rubber paint or varnish either flexible or hard and the arts generally.

I claim:

1. As a new composition, a solution of rubber in cashew nut shell liquid.
2. As a new composition, a solution of rubber in cashew nut shell liquid, and a vulcanizer for the rubber.
3. As a new composition, a solution of rubber in cashew nut shell liquid, and a vulcanizer for both said materials.
4. As a new composition, a solution of vulcanized rubber in cashew nut shell liquid.
5. As a new composition, an intermixture of rubber and cashew nut shell liquid.
6. As a new manufacture, rubber modified with cashew nut shell liquid.
7. As a new manufacture, rubber in the vulcanized state and modified by cashew nut shell liquid.
8. As a new manufacture, a rubber composition having cashew nut shell liquid incorporated therein and which is insoluble in petroleums.
9. Electrical insulation comprising a composition containing rubber and cashew nut shell liquid.
10. In combination rubber and a plasticizer therefor of cashew nut shell liquid.
11. The method of plasticizing rubber which comprises mixing therewith cashew nut shell liquid.
12. The method which comprises heating a mixture of rubber and cashew nut shell liquid to effect a solution of the former in the latter.
13. The method which comprises mixing cashew nut shell liquid and rubber and vulcanizing them.
14. The method which comprises vulcanizing cashew nut shell liquid and then intermixing the same with rubber.
15. The method which comprises vulcanizing cashew nut shell liquid and then intermixing the same with rubber and continuing vulcanization.

16. The method which comprises dissolving cashew nut shell liquid and rubber in a vehicle, applying the solution, removing the vehicle, and then vulcanizing the rubber and cashew nut shell liquid.

17. As a new composition, a mixture of rubber, cashew nut shell liquid and a setting material for the cashew nut shell liquid.

18. The method which comprises modifying cashew nut shell liquid into a thickened state and working it into rubber.

19. The method which comprises heating cashew nut shell liquid to change it from its natural non-drying condition to a drying condition and intermixing it with rubber.

20. The method which comprises heating cashew nut shell liquid to about 600° F. and intermixing it with rubber.

In testimony that I claim the invention set forth above I have hereunto set my hand this 26th day of July, 1928.

MORTIMER T. HARVEY.